United States Patent
Takahashi et al.

(10) Patent No.: US 12,138,814 B2
(45) Date of Patent: Nov. 12, 2024

(54) CONTROL APPARATUS AND METHOD, AND MOTOR CONTROL SYSTEM

(71) Applicant: CANON KABUSHIKI KAISHA, Tokyo (JP)

(72) Inventors: Toshiya Takahashi, Kanagawa (JP); Hiroshi Kawachi, Tokyo (JP); Tsutomu Osaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 17/742,602

(22) Filed: May 12, 2022

(65) Prior Publication Data
US 2022/0362938 A1   Nov. 17, 2022

(30) Foreign Application Priority Data
May 13, 2021   (JP) .................................. 2021-081664

(51) Int. Cl.
G05B 11/01   (2006.01)
B25J 9/16   (2006.01)

(52) U.S. Cl.
CPC ........... B25J 9/1697 (2013.01); B25J 9/1664 (2013.01)

(58) Field of Classification Search
CPC ............ H02P 23/16; H02P 7/06; B25J 9/1664
See application file for complete search history.

(56) References Cited

U.S. PATENT DOCUMENTS

| 4,953,405 A | 9/1990 | Hara et al. |
|---|---|---|
| 5,301,552 A | 4/1994 | Nagura et al. |
| 5,381,693 A | 1/1995 | Kobayashi et al. |
| 5,410,591 A | 4/1995 | Takahashi |
| 5,838,886 A | 11/1998 | Takahashi et al. |
| 6,092,001 A | 7/2000 | Mizuno et al. |
| 6,652,320 B2 | 11/2003 | Inagawa et al. |
| 7,123,935 B2 | 10/2006 | Takahashi |
| 9,342,067 B2 | 5/2016 | Osaka |
| 9,348,331 B2 | 5/2016 | Ishikawa et al. |
| 9,505,133 B2 | 11/2016 | Osaka |
| 9,902,073 B2 | 2/2018 | Osaka |
| 10,259,121 B2 | 4/2019 | Osaka et al. |
| 10,661,443 B2 | 5/2020 | Osaka |
| 2002/0025722 A1 | 2/2002 | Inagawa et al. |
| 2014/0306644 A1 | 10/2014 | Sakai et al. |

(Continued)

FOREIGN PATENT DOCUMENTS

| JP | 2006-042483 A | 2/2006 |
|---|---|---|
| JP | 2012-231621 A | 11/2012 |
| JP | 2014-207770 A | 10/2014 |

(Continued)

OTHER PUBLICATIONS

Sep. 24, 2024 Office Action in Japanese Patent Application No. 2021-081664 (with English translation).

*Primary Examiner* — Karen Masih
(74) *Attorney, Agent, or Firm* — Venable LLP

(57) ABSTRACT

A control apparatus includes a control unit that controls a first motor and a second motor. The control unit controls a rotation angle of a driven unit using one of the first motor and the second motor based on a direction of disturbance and controls, using the other of the first motor and the second motor, backlash removal from a decelerating unit configured to transmit an output of the first motor or the second motor to the driven unit.

15 Claims, 5 Drawing Sheets

(56) References Cited

U.S. PATENT DOCUMENTS

2020/0039576 A1\* 2/2020 Shoji .................... B62D 15/025
2020/0283242 A1 9/2020 Osaka

FOREIGN PATENT DOCUMENTS

| JP | 2016-029755 A | 3/2016 |
| JP | 6241240 B2 \* | 12/2017 |
| JP | 2020-142347 A | 9/2020 |

\* cited by examiner ns and a motor control system.

CONTROL APPARATUS AND METHOD, AND MOTOR CONTROL SYSTEM

BACKGROUND OF THE INVENTION

Field of the Invention

The present invention relates to a control apparatus and method, and a motor control system.

Description of the Related Art

A panhead system (motor control system) in which a camera is attached to an electric panhead that can provide panning and tilting operations enables the panhead and camera to be remotely controlled. However, in a case where such a panhead system is used outdoors, the camera may shake due to the influence of disturbance such as wind, and the quality of a captured image may deteriorate.

Japanese Patent Laid-Open No. ("JP") 2016-29755 discloses a panhead camera system that detects torque applied to a pan axis and tilt axis due to the influence of disturbance, such as wind, and changes a driving speed according to the detected torque. This configuration can move a camera to a preset imaging position even when a high load is applied.

There is known a motor control system that includes two motors one of which is used to control a rotation angle and the other of which is used to control a backlash removing torque. This motor control system can move the backlash to one side by applying the backlash removing torque in a direction opposite to a driving direction through the rotation angle control, and can thereby suppress jogging caused by the backlash.

However, the panhead camera system disclosed in JP 2016-29755 cannot reduce shakes caused by the disturbance even if the camera can be moved to the preset imaging position.

In addition, the motor control system that includes two motors cannot provide stable shake-free control depending on the magnitude and direction of the disturbance.

SUMMARY OF THE INVENTION

The present invention provides a control apparatus and method, and a motor control system, each of which can reduce a shake caused by disturbance.

A control apparatus according to one aspect of the present invention includes at least one processor, and at least one memory coupled to the at least one processor storing instructions that, when executed by the at least one processor, cause the at least one processor to function as a control unit configured to control a first motor and a second motor. The control unit controls a rotation angle of a driven unit using one of the first motor and the second motor based on a direction of disturbance and controls, using the other of the first motor and the second motor, backlash removal from a decelerating unit configured to transmit an output of the first motor or the second motor to the driven unit. A control method corresponding to the above control apparatus also constitutes another aspect of the present invention.

A motor control system according to one aspect of the present invention includes a first motor, a second motor, a decelerating unit configured to transmit an output of one of the first motor and the second motor to a driven unit, and the above control unit.

Further features of the present invention will become apparent from the following description of exemplary embodiments with reference to the attached drawings.

DESCRIPTION OF THE EMBODIMENTS

Figure 1:
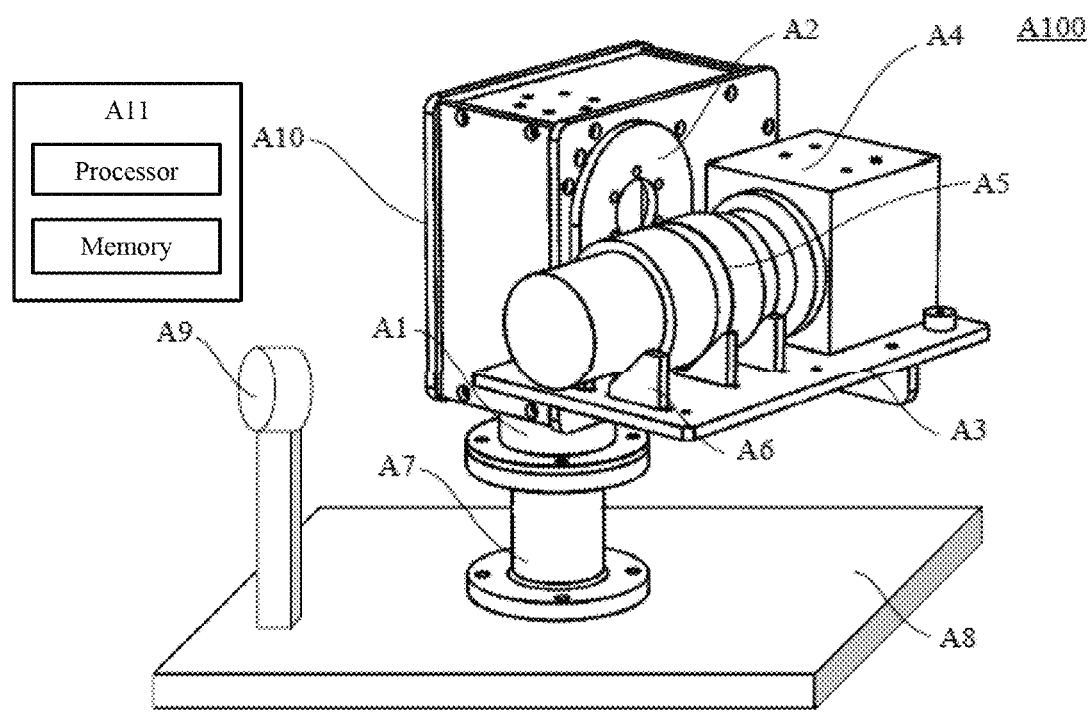
FIG. 1 is a perspective view of a panhead system according to a first embodiment.

Referring now to the accompanying drawings, a detailed description will be given of embodiments according to the present invention. Corresponding elements in respective figures will be designated by the same reference numerals, and a duplicate description thereof will be omitted.

First Embodiment

Referring now to FIG. 1, a description will be given of a panhead system (automatic panhead system) A100 as a motor control system according to a first embodiment of the present invention. FIG. 1 is a perspective view of the panhead system A100 according to this embodiment. The panhead system A100 includes an electric panhead A10, a control unit (control apparatus) A11 that stores an imaging position of the electric panhead A10 and controls a movement of the electric panhead A10 to a designated position (imaging position), and a wind power sensor (disturbance detecting unit, anemometer or wind gauge) A9 that measures a direction and magnitude of wind applied to the electric panhead A10.

Data indicating a measured value of the wind power sensor A9 is output to the control unit A11 that controls the electric panhead A10. The control unit A11 can adjust the control of the electric panhead A10 according to the measured value of the wind power sensor A9. The wind power sensor A9 needs to be installed at an optimum position for measuring the direction and magnitude of the wind (disturbance) applied to the electric panhead A10, and changing a relative positional relationship between the electric panhead A10 and the wind power sensor A9 after the installation is undesirable. Therefore, the wind power sensor A9 is fixed to an attachment base A8 to which the electric panhead A10 is fixed via a panhead base A7. While FIG. 1 illustrates that the panhead system A100 includes a single wind power sensor A9, the panhead system A100 may include a plurality of wind power sensors. The wind power sensor A9 may be attached to the electric panhead A10.

The electric panhead A10 includes two actuators, i.e., a pan-axis actuator (first driving unit) A1 that is rotatable in a lateral (horizontal) direction and a tilt-axis actuator (second driving unit) A2 that is rotatable in a longitudinal (vertical) direction. The tilt-axis actuator A2 is disposed above the pan-axis actuator A1. However, this embodiment is not limited to this embodiment, and a positional relationship between the pan-axis actuator A1 and the tilt-axis actuator A2 may be reversed. A camera (image pickup apparatus) A4 for imaging is attached to the tilt-axis actuator A2 via a camera attachment plate A3. A proper lens (interchangeable lens) A5 is attached to the camera A4 for each imaging, and a lens A5 is held by a lens holder (holding unit) A6 provided on the camera attachment plate A3 to hold the lens A5.

Figure 2:
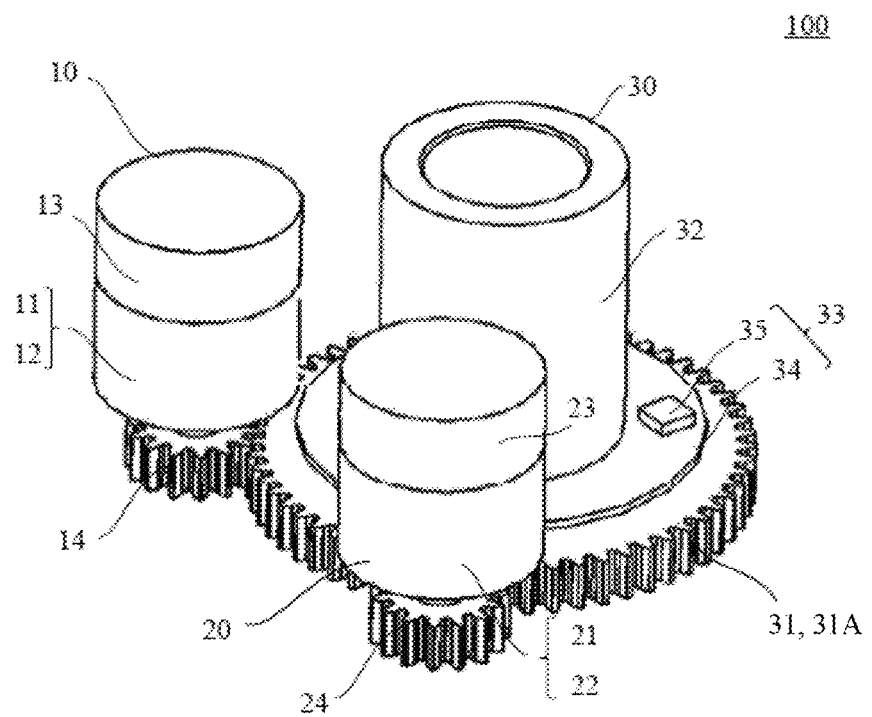
FIG. 2 is a perspective view of a motor control system according to the first embodiment.

Referring now to FIG. 2, a description will be given of a motor control system 100 adopted for each of the pan-axis actuator A1 and the tilt-axis actuator A2 for driving the electric panhead A10. FIG. 2 is a perspective view of the motor control system 100.

A first motor 10 includes an electric motor 11, a motor driver (motor driving unit) 12 for driving the electric motor 11, a motor position detector (motor position detecting unit) 13 for detecting a position of the electric motor 11, and a gear 14 that transmits an output of the electric motor 11 to a driven unit 30. Position information on the electric motor 11 detected by the motor position detector 13 is used for feedback control of the first motor 10. A second motor 20 includes an electric motor 21, a motor driver (motor driving unit) 22 for driving the electric motor 21, a motor position detector (motor position detecting unit) 23 for detecting a position of the electric motor 21, and a gear 24 that transmits an output of the electric motor 21 to the driven unit 30. Position information on the electric motor 21 detected by the motor position detector 23 is used for feedback control of the second motor 20.

The driven unit 30 includes a gear 31 to be driven by torques transmitted from the gears 14 and 24, an output shaft 32 fixed to the gear 31, and a position detecting sensor 33 for detecting a position of the driven unit 30. The position detecting sensor 33 is an optical encoder and includes a scale 34 and a detector (detecting unit) 35 opposite to the scale 34. The scale 34 is fixed to the output shaft 32, and the detector 35 is fixed to an unillustrated base. The position detecting sensor 33 having such a configuration can directly detect the position of the driven unit 30. The position detecting sensor 33 may be a magnetic type encoder or a capacitance type encoder, and the attachment positions of the scale 34 and the detector 35 may be reversed. This embodiment provides the gear 31 as a decelerating unit 31A (decelerator, speed reducing unit) to each of the first motor 10, the second motor 20, and the driven unit 30, but may provide an additional gear (train) in order to obtain a high decelerating ratio on a torque transmitting path between the first motor 10 or the second motor 20 and the driven unit 30.

A description will now be given of rotation angle control and the backlash removing torque control of each of the two motors (first motor 10 and second motor 20) in the motor control system 100 illustrated in FIG. 2. The control unit A11 controls driving of the two motors based on the imaging position movement data as a driving target position of the driven unit 30. In a case where the moving direction to the target position indicated by the imaging position movement data is clockwise when viewed from a paper plane direction, the first motor 10 is driven counterclockwise when viewed from the paper plane direction. At this time, the first motor 10 performs rotation angle control as feedback control to the target position, that is, the target rotation angle using the motor position detector 13 that detects the position of the first motor 10 or the position detecting sensor 33 that detects the position of the driven unit 30.

The rotation angle control of the first motor 10 alone may cause vibrational behavior due to backlash caused by a gap between the gears. Thus, if the number of gears is increased in order to obtain a particularly high decelerating ratio, the backlash caused by the gap cannot be ignored because the number of engagement points among the gears increases. Accordingly, the control unit A11 performs the backlash removing torque control by outputting a predetermined torque value to rotate the second motor 20 clockwise so that the driven unit 30 is rotated counterclockwise, thereby putting the backlash to one side and securing an engagement between the gears in the counterclockwise direction in the second motor 20. This structure can realize a state in which the gear 14 of the first motor 10 and the gear 24 of the second motor 20 both contact the gear 31 of the driven unit 30, and reduce the backlash caused by the gap among the gears constituting the decelerating unit.

Next follows a case where the moving direction of the driven unit 30 to the target position based on another imaging position movement data is counterclockwise viewed from the paper plane. In this case, in order to drive the second motor 20 clockwise, the control unit A11 performs rotation angle control as feedback control to the target position or target rotation angle using the motor position detector 23 that detects the position of the second motor 20 or the position detecting sensor 33 that detects the position of the driven unit 30. At the same time, the control unit A11 performs the backlash removing torque control by outputting a predetermined torque value to rotate the first motor 10 counterclockwise so that the driven unit 30 is rotated clockwise, thereby putting the backlash to one side and securing an engagement between the gears in the clockwise direction of the first motor 10. Thereby, even if the rotation direction of the driven unit 30 changes, both of the gear 14 of the first motor 10 and the gear 24 of the second motor 20 can contact the gear 31 of the driven unit and the backlash caused by the gap among the gears constituting the decelerating unit can be reduced. As a result, the driven unit 30 can be restrained from shaking.

Thus, control is performed while the control method of the first motor 10 and the second motor 20 is switched according to the rotation direction of the driven unit 30. In this embodiment, in the case where the driven unit 30 is moved clockwise, the rotation angle is controlled for the first motor 10 and the backlash removing torque is controlled for the second motor 20, but the present invention is not limited to this embodiment, and both control methods may be exchanged. Similarly, the control method can be exchanged for the counterclockwise rotation. In this embodiment, the number of motors is, but not limited to, two, and may be larger than two such as three or four. A method of controlling the rotation angle for at least one motor and for controlling the backlash removing torque for the remaining motors may be adopted.

Figure 3:
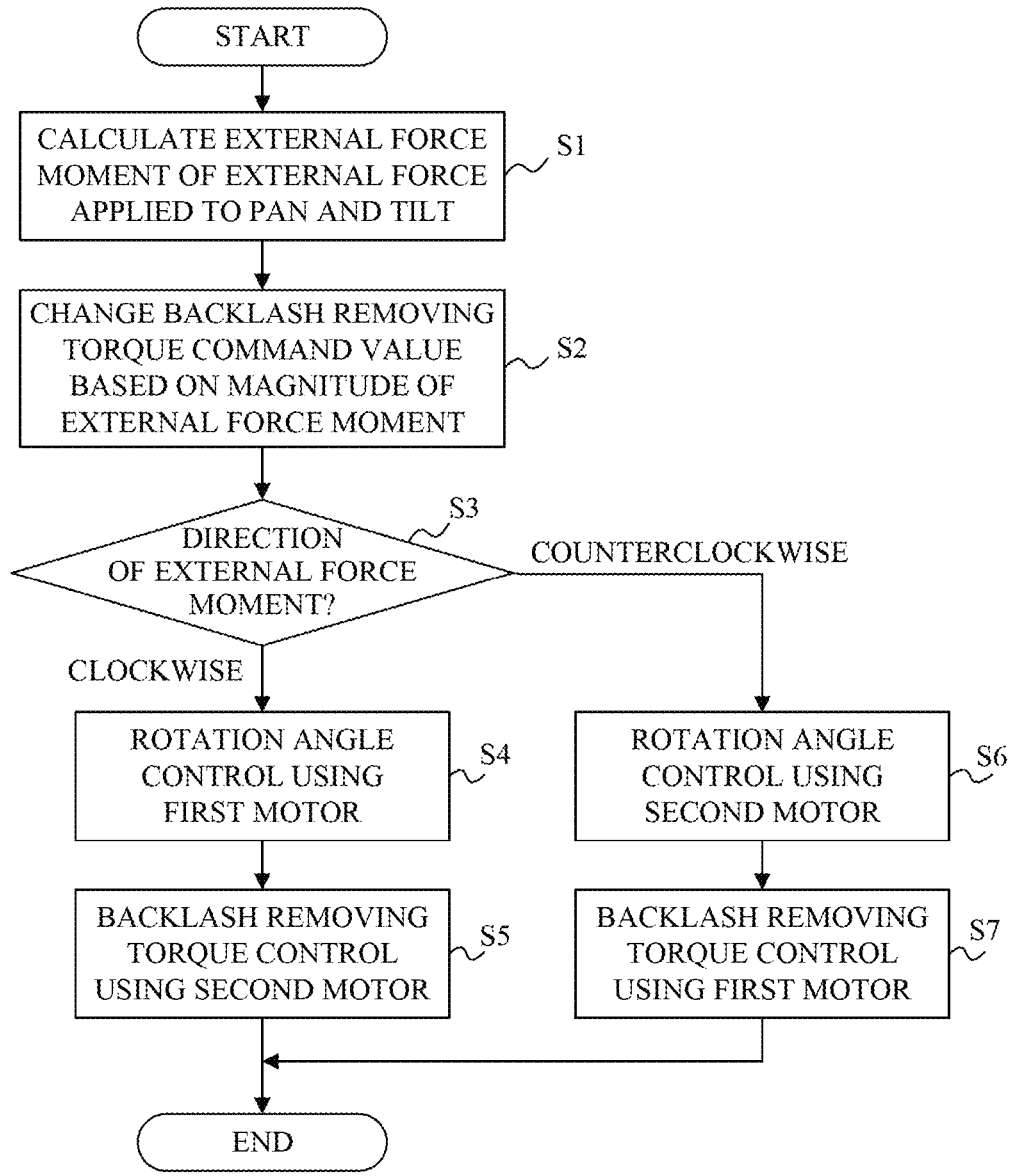
FIG. 3 is a flowchart illustrating switching processing of two motors in the panhead system according to the first embodiment.

Referring now to FIG. 3, a description will be given of switching processing of the control method of the two motors in the panhead system A100 (control method of the panhead system A100). FIG. 3 is a flowchart illustrating the switching processing of the control method of the two motors in the panhead system A100. A description will now be given of a case where control for maintaining the current position is performed over the pan-axis actuator A1 and the tilt-axis actuator A2. At this time, the motor control system inside the pan-axis actuator A1 and the tilt-axis actuator A2 performs the backlash removing torque control by driving the second motor 20 so as to increase the rigidity and the rotation angle control that maintains the current position of the first motor 10.

Initially, in the step S1, the control unit A11 detects the wind power as disturbance using the wind power sensor A9 attached to the attachment base A8. The control unit A11 acquires current position information using the detector 35 provided to the driven unit 30 of each of the pan-axis actuator A1 and the tilt-axis actuator A2 under control while recording the magnitude and direction of the wind power (information on the wind force sensor A9). The control unit A11 calculates an external force moment caused by the wind power applied to the pan-axis actuator A1 and the tilt-axis actuator A2 based on the information on the wind power sensor A9 and the current position information.

Next, in the step S2, the control unit A11 compares the preset external force moment (predetermined value) with the external force moment calculated in step S1. In the case where the calculated external force moment is equal to or greater than a predetermined value, the control unit A11 sets the torque command value (rattling torque command value) of the motor for performing the backlash removing torque control to be larger than the external force moment calculated in step S1. On the other hand, in the case where the calculated external force moment is smaller than a predetermined value, the control unit A11 sets a preset torque command value. The preset torque command value may be a value obtained by multiplying the torque command value set as the backlash removing torque when operating the electric panhead A10 by a safety factor.

Next, in the step S3, the control unit A11 determines the direction of the external force moment applied to each of the pan-axis actuator A1 and the tilt-axis actuator A2 calculated in the step S1. In the case where the direction of the external force moment is clockwise, the control unit A11 drives the first motor 10 by the rotation angle control (step S4) and the second motor 20 by the backlash removing torque control (step S5). The backlash removing torque command value at this time is the value set in the step S2. On the other hand, in the case where the direction of the external force moment is counterclockwise, the control unit A11 drives the second motor 20 by the rotation angle control (step S6), and drives the first motor 10 by the backlash removing torque control (step S7). The backlash removing torque command value at this time is the value set in the step S2.

In this embodiment, depending on whether the direction of the external force moment is clockwise or counterclockwise, the first motor 10 and the second motor 20 inside the pan-axis actuator A1 and the tilt-axis actuator A2 operate in the same role. However, the present invention is not limited to this embodiment, and the roles of the first motor 10 and the second motor 20 may be changed depending on the mounting method, the holding attitude, and the like. This embodiment has discussed the control for maintaining the current position, but the present invention is not limited to this embodiment, and the pan-axis actuator A1 and the tilt-axis actuator A2 may be in operation.

Even in the case where disturbance, such as wind, occurs, this embodiment can suppress the backlash by making variable the backlash removing torque. Switching the role of each motor according to the direction of the external force moment can always reduce the backlash caused by the gap among the gears constituting the decelerating unit even when the driving direction changes. This structure can restrain the pan-axis actuator A1 and the tilt-axis actuator A2 from shaking. In the case where the external force moment becomes small, the backlash removing torque command value is reset to the original value and the motor is prevented from bearing the burden on unnecessary rotation angle control. Therefore, unnecessary heat generation and energy consumption can be suppressed.

This embodiment measures the disturbance using the wind power sensor A9 separate from the electric panhead A10 in order to detect the external force, but the present invention is not limited to this embodiment. For example, the disturbance may be measured by using a current sensor (ammeter) that detects a current value flowing when the pan-axis actuator A1 and the tilt-axis actuator A2 of the electric panhead A10 are driven.

Second Embodiment

A description will now be given of a panhead system (automatic panhead system) as a motor control system according to a second embodiment of the present invention. In the case where the panhead system is mounted on a movable body, especially a high-speed movable body such as a car, airplane, or ship, and an image is captured, an external force is applied to the panhead system due to inertia such as gravity and centrifugal force when the movable body is accelerated or its moving direction is changed. In control for holding the panhead system at a position of an imaging attitude, the external force caused by the inertia of the movable body (disturbance caused by the movable body) may shift the panhead system from the position of the imaging attitude to be held, and it is required to detect the disturbance and suppress the shift.

Similar to the panhead system A100 according to the first embodiment, the panhead system according to this embodiment includes a pan-axis actuator (first driving unit) A1 and a tilt-axis actuator (second driving unit) A2 that employ a motor control system including two motors. Those elements in this embodiment which are corresponding elements in the first embodiment will be designated by the same reference numerals, and a description thereof will be omitted.

Figure 4:
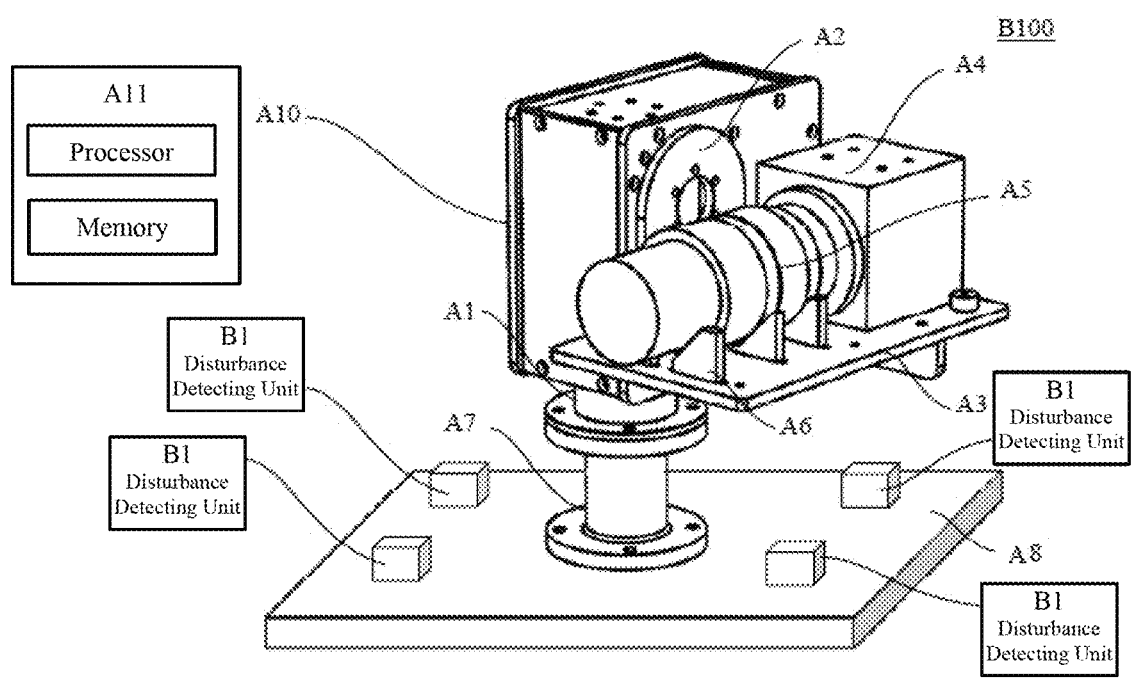
FIG. 4 is a perspective view of a panhead system according to a second embodiment.

FIG. 4 is a perspective view of a panhead system (automatic panhead system) B100 mounted on a movable body. In the panhead system B100, the electric panhead A10 is fixed via the panhead base A7 to the attachment base A8 for fixing the electric panhead A10 to an installation environment. The electric panhead A10 includes two actuators, i.e., the pan-axis actuator A1 and the tilt-axis actuator A2, and the camera A4 for imaging is attached above the tilt-axis actuator A2 via the camera attachment plate A3. The lens A5 is attached to the camera A4, and held by the lens holder A6 provided to the camera attachment plate A3.

In this embodiment, (disturbance detecting units, accelerometers) B1 for detecting the acceleration generated when the movable body is operated are attached to the attachment base A8. The measured value of each acceleration sensor B1 is output to the control unit A11 that controls the electric panhead A10. The control unit A11 can control the electric panhead A10 based on the measured values of the acceleration sensors B1. In this embodiment, four acceleration sensors B1 are attached to the attachment base A8 on which the electric panhead A10 is installed. Thereby, not only acceleration in a translation direction applied to the attachment base A8 but also acceleration around an axis of each translation direction can be detected based on the attachment positions and the output difference of the four acceleration sensors B1. While four acceleration sensors B1 are provided in this embodiment, the present invention is not limited to this embodiment, and three or less or five or more acceleration sensors may be provided.

This structure can detect, using the acceleration sensors B1, disturbance caused by the movements of the movable body and applied to the electric panhead A10. Then, the control unit A11 determines whether or not the detected (calculated) external force moment is equal to or larger than a preset external force moment (predetermined value) and changes the torque command value of the backlash removing torque of the motor based on the determination result. In this embodiment, the method of driving the motor is the same as that of the first embodiment, and thus a description thereof will be omitted.

The panhead system B100 in this embodiment can make variable the backlash removing torque according to the detecting result of the external force applied to the electric panhead A10 by the acceleration sensor B1, and can suppress a shift of the camera on the electric panhead even if the disturbance caused by the movable body is applied. Similar to the first embodiment, this embodiment can prevent a high load state of the motor from continuing in which the backlash removing torque command value is unnecessarily increased and rotation angle control is performed, so that unnecessary heat generation and energy consumption can be suppressed.

Third Embodiment

A description will now be given of a panhead system (vertical multijoint type electric panhead system) as a motor control system according to a third embodiment of the present invention. The vertical multijoint type electric panhead system that connects a plurality of movable axes and increases the degree of freedom so as to capture an image at a complicated attitude requires a power line that supplies power to the camera mounted at the tip and a signal line that transmits a video signal to be routed outside the panhead system. At that time, in order to capture an image at a complicated attitude, it is required to prevent the wiring routed outside the panhead system from being pinched and damaged between movable shafts and the wiring driven with the movable shafts from getting damaged by the bending stress. Thus, it is necessary to fix the wiring so that the wiring has a degree of freedom, such as fixing the wiring a plurality of points at points rather than fixing the entire wiring to the vertical multijoint type electric panhead system. This wiring fixing method can change the wiring shape for each imaging attitude, and varies the load applied to the wiring fixing portion of the vertical multijoint type electric panhead system (refereed to as disturbance caused by wiring hereinafter). Since the vertical multijoint type electric panhead system may unexpectedly shake due to the disturbance caused by the wiring, it is required to detect and suppress the disturbance caused by the wiring.

Similar to the first embodiment, the panhead system according to this embodiment has a structure that connects a plurality of movable shafts adopting the motor control system including the two motors. Those elements in this embodiment which are corresponding elements in the first embodiment will be designated by the same reference numerals, and a description thereof will be omitted.

Figure 5:
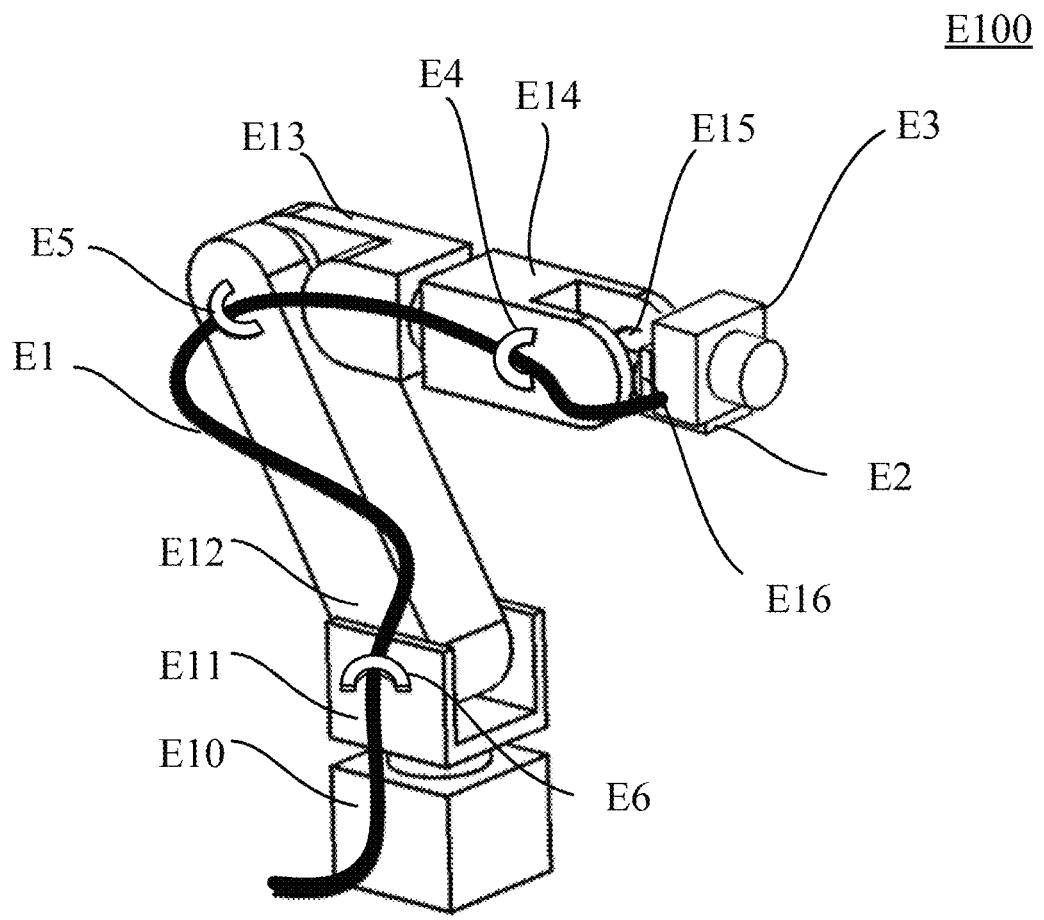
FIG. 5 is a perspective view of a panhead system according to a third embodiment.

FIG. 5 is a perspective view of a panhead system (vertical multijoint type electric panhead system) E100 according to this embodiment. According to the structure of the panhead system E100, a first movable unit E11 is connected to a panhead base unit E10 for attaching the panhead system E100 to an external environment, and is rotatable around a vertical axis in the connection direction. A second movable unit E12 is connected through a link provided to the first movable unit E11 and a rotation axis that is tilted to the rotation axis of the first movable unit E11 by 90 degrees. A third movable unit E13 is connected through a link provided to the second movable unit E12 and a rotation axis parallel to the rotation axis of the second movable unit E12. A fourth movable unit E14 is connected through a link provided to the third movable unit E13 and a rotation axis that is tilted to the rotation axis of the third movable unit E13 by 90 degrees. A fifth movable unit E15 is connected through a link provided to the fourth movable unit E14 and a rotation axis that is tilted to the rotation axis of the fourth movable unit E14 by 90 degrees.

A sixth movable unit E16 is connected through a link provided to the fifth movable unit E15 and a rotation axis parallel to the rotation axis of the fourth movable unit E14. A camera E3 is attached so that a lens faces iii the rotation axis direction of the sixth movable unit E16 via a camera mounting base E2 attached to the sixth movable unit E16. Due to this structure, the camera E3 mounted on the panhead system E100 has six degrees of freedom: two degrees of freedom in the translational direction, one degree of freedom in the vertical direction, and three degrees of freedom around the axis in each movement direction. Therefore, the camera E3 can move freely with six degrees of freedom, and can capture an image in a complicated attitude.

The movable unit according to this embodiment includes an actuator that employs the motor control system described in the first embodiment, and can be driven by two controls, i.e., the rotation angle control and the backlash removing torque control. Each of the first motor 10 and the second motor 20 for driving the motor control system is provided with an unillustrated current sensor (disturbance detecting unit) for detecting a current value, and a current value for driving the driven unit 30 and a current value for maintaining a position of the driven unit 30 can be measured. This structure can convert the current value into a torque applied to the driven unit 30 through calculation. A torque sensor (disturbance detecting unit) for directly detecting the torque applied to the driven unit 30 may be directly attached to the output shaft 32.

In order to calculate the disturbance due to wiring E1, the wiring E1 is moved to a joint angle defined as the imaging attitude and the joint angle and the torque value at that time are recorded before the wiring E1 is routed outside the panhead system E100. This work may be performed through an operation within a movable range before shipping, or the joint angle and torque value can be recorded or corrected in a specified operating attitude after the panhead system E100 is installed.

The wiring E1 connected to the camera E3 is fixed at a link position (first wiring fixing portion E4) provided to the fourth movable unit E14. The wiring E1 at this time is fixed in a state where the sixth movable unit E16 and the fifth movable unit E15 secure sufficient lengths within the movable range so that no force is applied to the wiring E1. The wiring E1 is fixed at a link position (second wiring fixing portion E5) provided to the second movable unit 12. The wiring E1 at this time is fixed in a state where a surplus length is secured so that no force is applied to the wiring E1 within the movable range of the third movable unit E13 similarly to the first wiring fixing portion E4. The wiring E1 is fixed at a link position (third wiring fixing portion E6) provided to the first movable unit E11. The wiring E1 at this time is fixed in a state where a sufficient length is secured so that no force is applied to the wiring E1 within a movable range of the third movable unit E13.

A description will now be given of a method of calculating the external force caused by the wiring E1 when the camera is moved to a position of the imaging attitude. This embodiment will discuss control of maintaining the attitude of the panhead system E100 at the current position. The torque sensor provided to each movable unit detects the torque applied to the driven unit 30 while the attitude is maintained. Next, the control unit A11 specifies the torque corresponding to the joint angles of the first to sixth movable units constituting the current attitude based on the torque value associated with the previously recorded joint angles. The control unit A11 compares the currently detected torque with the specified torque (predetermined value), and determines whether or not the detected torque is equal to or larger than the predetermined value. The control unit A10 changes the torque command value of the motor based on the determination result. In this embodiment, the motor driving method is the same as that of the first embodiment, and thus a description thereof will be omitted.

In this embodiment, the control unit changes the backlash removing torque command value for each axis against the disturbance caused by the wiring, based on a comparison result between a torque for the rotation angle of each axis detected in the case where each axis is driven before the wiring is fixed, and a torque for the rotation angle of each axis in the case where each axis is driven after the wiring is fixed. Therefore, this embodiment can restrain the panhead system from shaking, even if the disturbance caused by the wiring occurs. this embodiment can prevent a high load state of the motor from continuing in which the backlash removing torque command value is unnecessarily increased and rotation angle control is performed, so that unnecessary heat generation and energy consumption can be suppressed.

In the case where the vertical multijoint type electric panhead system serves as an industrial robot in addition to capturing an image using the camera, shaking generated by the disturbance caused by the wiring may also deteriorate the service accuracy. Thus, in the case where the vertical multijoint type electric panhead system serves other than imaging, this embodiment can reduce a decrease in service accuracy caused by the disturbance. While this embodiment has discussed the vertical multijoint type electric panhead system with the camera attached to the tip, this embodiment is applicable to a vertical multijoint type robot to which no camera is attached. This embodiment can reduce the shakes and improve the service accuracy of the robot. Similar to the first embodiment, this embodiment can suppress unnecessary heat generation and energy consumption.

In each embodiment, the panhead systems A100, B100, and E100 are panhead systems to which an image pickup apparatus (camera) is attachable. Each panhead system includes a first motor 10, a second motor 20, and a decelerating unit (gears 14, 24, and 31) that transmits the output of the first motor or the second motor to the driven unit. Each panhead system further includes a disturbance detecting unit for detecting disturbance, and a control unit A11 for controlling the first motor and the second motor. The control unit controls the rotation angle of the driven unit using one of the first motor and the second motor and the backlash removal from the decelerating unit using the other of the first motor and the second motor based on the direction of the disturbance.

The control unit may calculate the external force moment based on the disturbance. In the case where the direction of the external force moment is a first direction, the control unit may control the rotation angle using the first motor and the backlash removal using the second motor. In the case where the direction of the external force moment is a second direction, the control unit may control the rotation angle using the second motor and the backlash removal using the first motor. The first direction (clockwise direction) and the second direction (counterclockwise direction) may be rotation directions opposite to each other.

The control unit may set the torque command value of the other of the first motor and the second motor based on the magnitude of the disturbance. The control unit may calculate the external force moment based on the disturbance. In the case where the magnitude of the external force moment is larger than the predetermined value, the control unit may set the torque command value to a value equal to or larger than the magnitude of the external force moment. In the case where the magnitude of the external force moment is smaller than the predetermined value, the control unit may set the torque command value to the predetermined value. The control unit may set the torque command value based on a comparison between the torque detected by the disturbance detecting unit and a predetermined torque.

The disturbance detecting unit may include the wind power sensor A9, the acceleration sensor B1 the current sensor, or the torque sensor. The panhead system may include the first driving unit (pan-axis actuator A1) and the second driving unit (tilt-axis actuator A2), and the first motor and the second motor are provided to both the driving unit and the second driving unit.

Each embodiment detects the moment generated by the disturbance (external force) applied to the panhead system, switches the rotation angle control and the backlash removing control of the two motors according to the direction and magnitude of the moment, and changes the torque command value for the backlash removing torque. Therefore, even if the direction of the disturbance changes during the operation of the panhead system, each embodiment can seamlessly suppress shakes. Even in the case where the backlash between the gears occurs due to changes over time or abrasion of the decelerating unit, the shake suppressing effect can be maintained because the backlash generated in the decelerating unit is directly controlled. Each embodiment can provide a panhead system and a control apparatus and method of the panhead system, each of which can reduce shakes caused by disturbance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-d escribed embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-081664, filed on May 13, 2021, which is hereby incorporated by reference herein in its entirety.

What is claimed is:

1. A control apparatus comprising:
   at least one processor; and
   at least one memory coupled to the at least one processor storing instructions that, when executed by the at least one processor, cause the at least one processor to function as a control unit configured to control a first motor and a second motor,
   wherein the control unit controls (i) a rotation angle of a driven unit using one of the first motor and the second motor based on a direction of disturbance, and (ii) using the other of the first motor and the second motor, backlash removal from a decelerating unit configured to transmit an output of the first motor or the second motor to the driven unit.

2. The control apparatus according to claim 1, wherein the control unit calculates an external force moment based on the disturbance, controls the rotation angle using the first motor and the backlash removal using the second motor in a case where a direction of the external force moment is a first direction, and controls the rotation angle using the second motor and the backlash removal using the first motor in a case where the direction of the external force moment is a second direction.

3. The control apparatus according to claim 2, wherein the first direction and the second direction are rotating directions that are opposite to each other.

4. The control apparatus according to claim 1, wherein the control unit sets a torque command value of the other of the first motor and the second motor based on a magnitude of the disturbance.

5. The control apparatus according to claim 4, wherein the control unit calculates an external force moment based on the disturbance, sets the torque command value to a value equal to or greater than a magnitude of the external force moment in a case where the magnitude of the external force moment is greater than a predetermined value, and sets the torque command value to the predetermined value in a case where the magnitude of the external force moment is less than the predetermined value.

6. The control apparatus according to claim 4, wherein the control unit sets the torque command value based on a comparison between a torque detected by the disturbance detecting unit and a predetermined torque.

7. A motor control system comprising:
   a first motor;
   a second motor;
   a decelerating unit configured to transmit an output of the first motor or the second motor to a driven unit; and
   a control unit configured to control the first motor and the second motor,
   wherein the control unit controls (i) a rotation angle of the driven unit by using one of the first motor and the second motor based on a direction of disturbance, and (ii) backlash removal from the decelerating unit using the other of the first motor and the second motor.

8. The motor control system according to claim 7, further comprising a disturbance detecting unit configured to detect the disturbance.

9. The motor control system according to claim 8, wherein the disturbance detecting unit includes a wind power sensor.

10. The motor control system according to claim 8, wherein the disturbance detecting unit includes an acceleration sensor.

11. The motor control system according to claim 8, wherein the disturbance detecting unit includes a current sensor.

12. The motor control system according to claim 8, wherein the disturbance detecting unit includes a torque sensor.

13. The motor control system according to claim 8, further comprising a first driving unit and a second driving unit,
    wherein the first motor and the second motor are provided in both of the first driving unit and the second driving unit.

14. The motor control system according to claim 7, wherein the motor control system is a panhead system to which an image pickup apparatus is attachable.

15. A control method for controlling a first motor and a second motor, the control method comprising the steps of:
    controlling a rotation angle of a driven unit using one of the first motor and the second motor based on a direction of disturbance; and
    controlling, using the other of the first motor and the second motor, backlash removal from a decelerating unit configured to transmit an output of the first motor or the second motor to the driven unit.

* * * * *